(12) United States Patent
Numnual et al.

(10) Patent No.: US 7,965,432 B2
(45) Date of Patent: Jun. 21, 2011

(54) LIGHT QUANTITY CONTROL DEVICE

(75) Inventors: Phichet Numnual, Pathumthani (TH); Takashi Nakano, Chiba (JP); Makoto Mikami, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/368,552

(22) Filed: Feb. 10, 2009

(65) Prior Publication Data
US 2009/0153937 A1    Jun. 18, 2009

Related U.S. Application Data

(63) Continuation of application No. PCT/JP2007/065939, filed on Aug. 16, 2007.

(30) Foreign Application Priority Data

Sep. 11, 2006  (JP) .................................. 2006-245772

(51) Int. Cl.
G02B 26/02    (2006.01)
(52) U.S. Cl. ....................................................... 359/234
(58) Field of Classification Search .................. 359/227, 359/230, 233–236; 396/449, 450, 458, 493, 396/495, 510
See application file for complete search history.

(56) References Cited

U.S. PATENT DOCUMENTS

| | | | | |
|---|---|---|---|---|
| 2005/0073604 A1* | 4/2005 | Umezu | .......................... | 348/363 |
| 2006/0039695 A1* | 2/2006 | Naganuma | ..................... | 396/485 |

FOREIGN PATENT DOCUMENTS

| | | |
|---|---|---|
| JP | 4-119434 | 10/1992 |
| JP | 5-241224 | 9/1993 |
| JP | 11-194384 | 7/1999 |
| JP | 11-194387 A1 | 7/1999 |
| JP | 2004-109531 A1 | 4/2004 |

OTHER PUBLICATIONS

Dictionary.com, "along" accessed Apr. 18, 2010 at dictionary.com.*
International Search Report for International Application No. PCT/JP2007/065939 dated Nov. 1, 2007.
Japanese Office Action dated Oct. 26, 2010, along with its English translation.
Chinese Office Action dated Nov. 4, 2010, along with its English translation.

* cited by examiner

Primary Examiner — Stephone B Allen
Assistant Examiner — Jennifer L. Doak
(74) Attorney, Agent, or Firm — Kratz, Quintos & Hanson, LLP

(57) ABSTRACT

A light quantity control device includes: a bottom board having an opening; a first blade and second blade linearly moving in opposing directions and changing in an opening area of the opening; a supporting blade overlapping the first blade and closing the opening in cooperation with the first blade and second blade; and a driving lever connected to the first blade, the second blade, and supporting blade, and driving the first blade, second blade, and the supporting blade by rotation of the driving lever. The first blade and supporting blade are engaged with an identical pin provided in the driving lever. The first blade and supporting blade are misaligned in such a way to reduce an overlapping degree of the first blade and supporting blade. The first blade and supporting blade bring the opening to the fully closed state in cooperation with the second blade.

4 Claims, 10 Drawing Sheets

FULLY OPEN STATE

FULLY CLOSED STATE

SMALL APERTURE STATE

LIGHT QUANTITY CONTROL DEVICE

CROSS-REFERENCE TO RELATED APPLICATION

This application is a continuation of and claims priority to International Patent Application No. PCT/JP2007/065939 filed on Aug. 16, 2007, which claims priority to Japanese Patent Application No. 2006-245772 filed on Sep. 11, 2006, subject matter of these patent documents is incorporated by reference herein in its entirety.

BACKGROUND OF THE INVENTION

1. Field of the Invention

The present invention relates to a light quantity control device for a camera.

2. Description of the Related Art

Conventionally, there has been known a light quantity control device for a camera. In the conventional light quantity control device, at lease two blades are movably supported in opposing directions in a linear manner relative to a bottom board having an opening, a rotational movement of a driving lever connected to these blades is changed to a liner movement, and the liner movement is outputted to the blades, thereby controlling the light quantity passing through the opening (see Japanese Patent Application Publication No. 5-241224).

However, in the conventional light quantity control device, a first blade and a second blade close the opening in cooperation with each other, the first blade and the second blade are engaged with individual pins, respectively, which are provided in the driving lever. To provide pins in such a way that movements of blades do not interfere, the arm of the driving lever has to be longer. Therefore, it is difficult to downsize the conventional light quantity control device.

SUMMARY OF THE INVENTION

It is therefore an object of present invention to provide a light quantity control device downsized by a simple structure.

According to an aspect of the present invention, there is provided a light quantity control device including: a bottom board having an opening; a first blade and a second blade linearly moving in opposing directions and changing in an opening area of the opening; a supporting blade overlapping the first blade and closing the opening in cooperation with the first blade and the second blade; and a driving lever connected to the first blade, the second blade, and the supporting blade, and driving the first blade, the second blade, and the supporting blade by rotation of the driving lever. The first blade and the supporting blade are engaged with an identical pin provided in the driving lever, the first blade and the supporting blade are misaligned in such a way to reduce an overlapping degree of the first blade and the supporting blade, and the first blade and the supporting blade bring the opening to the fully closed state in cooperation with the second blade.

With such a configuration, the opening is brought to the fully open state with the first blade overlapping the supporting blade, and the first blade and the supporting blade are misaligned in such a way to reduce an overlapping degree of the first blade and the supporting blade and the first blade and the supporting blade bring the opening to the fully closed state in cooperation with the second blade. Therefore, the space in which the blades are held can be reduced. Additionally, since the first blade and the supporting blade are engaged with the identical pin provided in the driving lever, the light quantity control device can be downsized by a simple structure without a provision of an elongated arm of the driving lever and without an increase in engagement points.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, an embodiment of the present invention.

A light quantity control device according to an embodiment of the present invention will be described below with reference to drawings.

Figure 1:
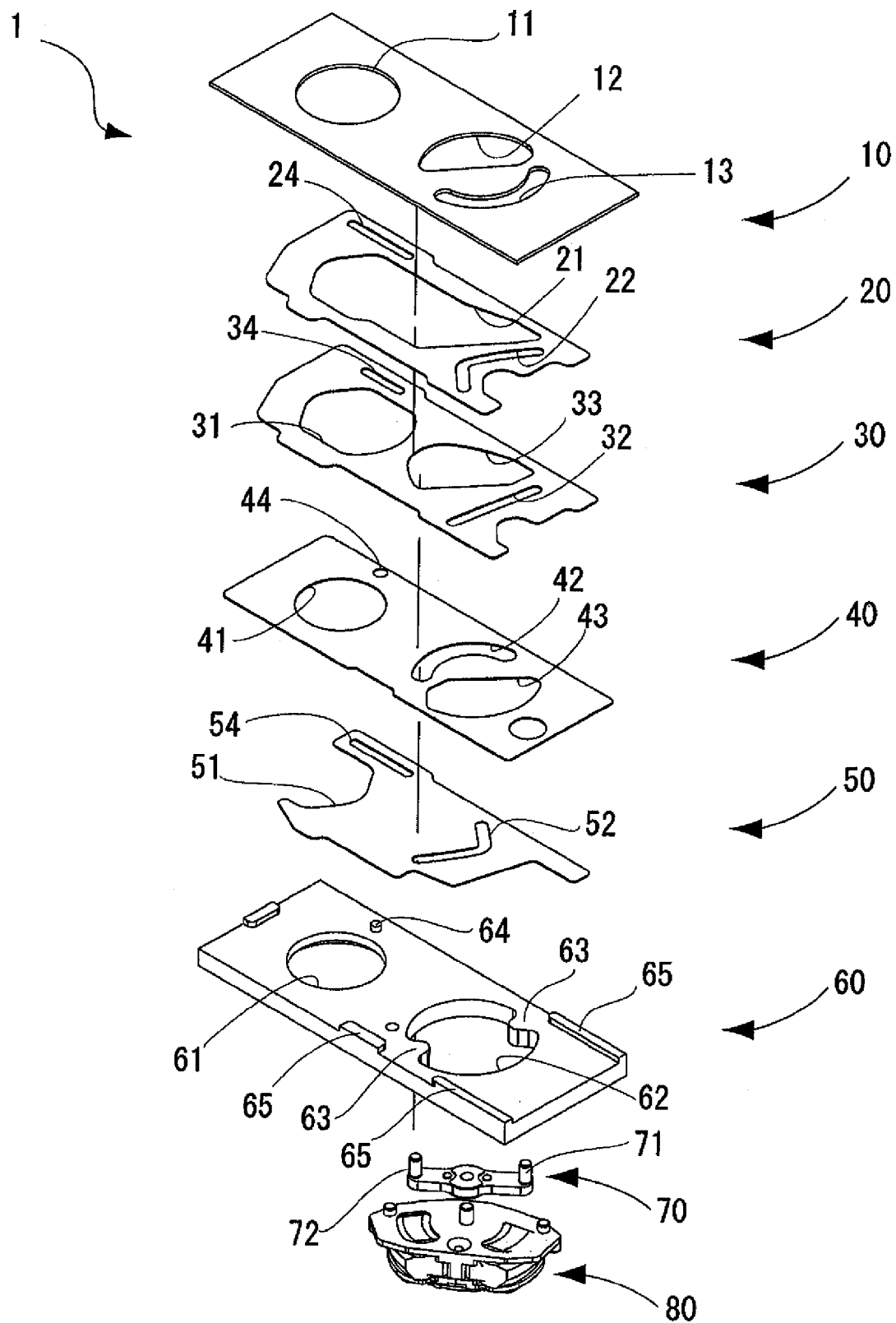
FIG. 1 is an exploded perspective view of a light quantity control device when viewed from the top.
Figure 2:
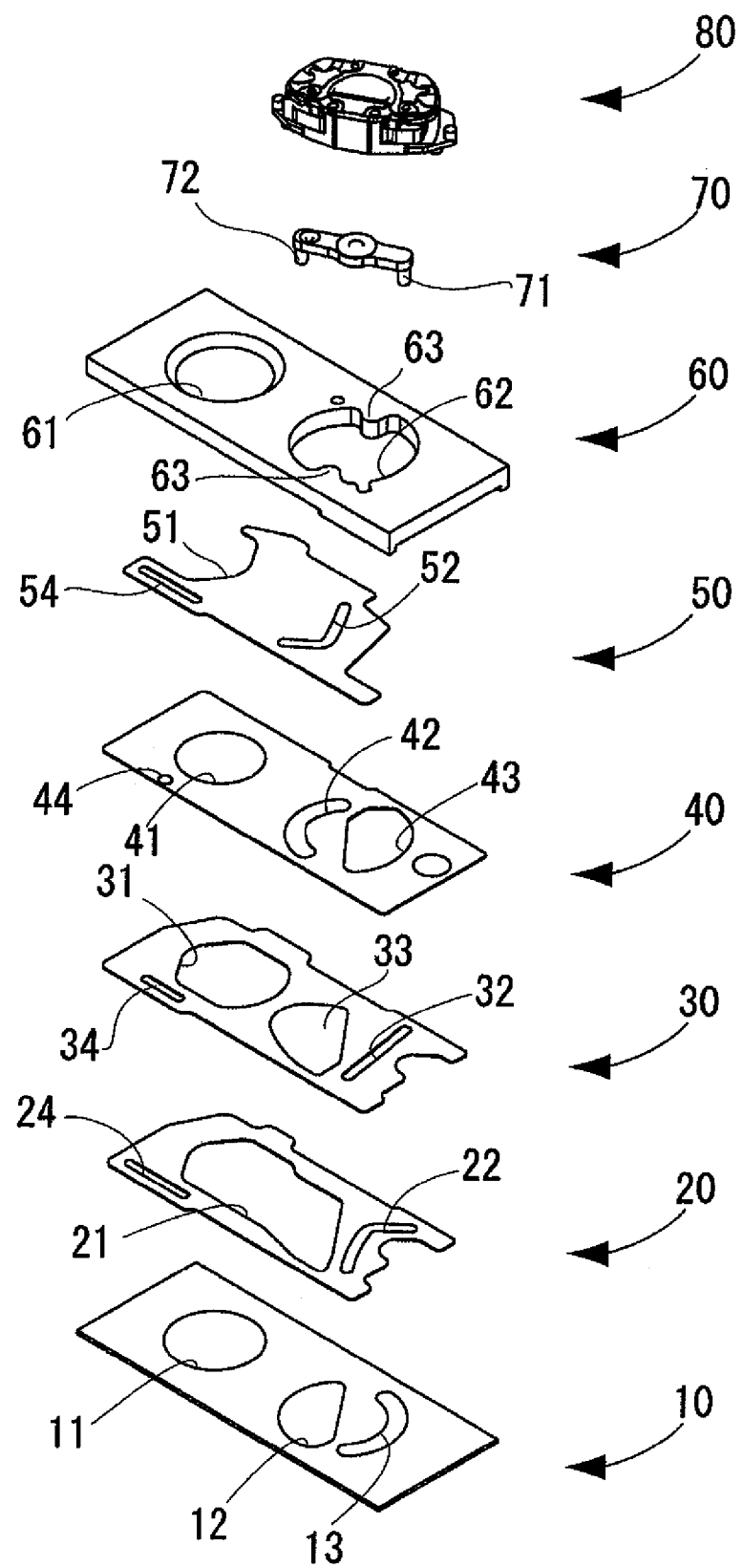
FIG. 2 is an exploded perspective view of the light quantity control device when viewed from the bottom.

FIG. 1 is an exploded perspective view of the light quantity control device when viewed from the top. FIG. 2 is an exploded perspective view of the light quantity control device when viewed from the bottom.

A light quantity control device 1 includes: a blade-supporting plate 10; a first blade 20; a supporting blade 30; a plate 40; a second blade 50; a bottom board 60; a driving lever 70; and a motor portion 80.

The first blade 20, the supporting blade 30, and the second blade 50 control a light quantity passing through an opening 61 formed in the bottom board 60 by using the movements thereof.

The blade-supporting plate 10 holds the blades and the like located between the blade-supporting plate10 and the bottom board 60 in an optical axis direction so as to restrict movements of the blades and the like in the optical axis direction.

Additionally, the blade-supporting plate 10 has an opening 11 for causing light to reach an image pickup device (not shown).

Further, the blade-supporting plate 10 has a receiving slot 13 and a receiving hole 12. The receiving slot 13 is located to face the opening 11 and has an arc shape so as to receive a first pin 71 of the of the driving lever 70. The receiving hole 12 for a second pin 72 of the driving lever 70 has a semicircular shape.

An opening 21, for changing the opening area of the opening 61, is formed in the first blade 20 and shaped in such a manner to spread in the entirety of the middle portion of the first blade 20. Additionally, the opening 21 also serves as a receiving hole for receiving the second pin 72 formed on the driving lever 70.

The first blade 20 is formed with a slot 22, which is engaged with the first pin 71 formed in the driving lever 70, in a widthwise direction of the first blade 20. The slot 22 is a cam having an substantially L-shape bending in the partway thereof.

Further, the first blade 20 is formed with the guide slot 24 which is engaged with a guide pin 64 formed on the bottom board 60 and which extends in a lengthwise direction of the first blade 20.

The supporting blade 30 has an opening 31 for changing the opening area of the opening 61.

A slot 32 is engaged with the first pin 71 and linearly extends in the widthwise direction of the supporting blade 30. Herein, the first blade 20 and the supporting blade 30 are engaged with the first pin 71 standing on the driving lever 70. Further, the supporting blade 30 overlaps the first blade 20, and closes the opening 61 in conjunction with the first blade 20 and the second blade 50.

The supporting blade 30 has a receiving hole 33 for receiving the movement of the second pin 72 and the receiving hole 33 has an arc shape.

Further, the supporting blade 30 has a guide slot 34 engaged with the guide pin 64 and the guide slot 34 extends in the lengthwise direction of the supporting blade 30. In response to the moving distance of the supporting blade 30, the guide slot 34 is shorter than the guide slot 24 formed in the first blade 20.

The plate 40 is accommodated to be sandwiched between the supporting blade 30 and the second blade 50.

Furthermore, the plate 40 has an opening 41 for passing through the light to reach the image pickup device.

In addition, the plate 40 has a receiving hole 42 for receiving the second pin 72 and the receiving hole 42 has an arc shape. The plate 40 has a receiving hole 43 for receiving the first pin 71 and the receiving hole 43 has a semicircular shape.

The plate 40 has an engagement hole 44 fitted onto the guide pin 64, whereby the plate 40 is fixed and is not movable with respect to the bottom board 60.

The second blade 50 has a notch section at its edge and forms a cutout 51. The second blade 50 has a slot 52 engaged with the second pin 72, and the slot 52 extends in a widthwise direction of the second blade 50. The slot 52 has an substantially L-shape that bents at a partway thereof and also serves as a cam.

The second blade 50 has a guide slot 54 engaged with the guide pin 64 and the guide slot 54 extends in the moving direction of the second blade 50.

The bottom board 60 has the opening 61, and a receiving hole 62 for receiving the driving lever 70. Further, the guide pin 64, which is engaged with the guide slots 54, 34, and 24, and which is fitted into the engagement hole 44, is formed at the proximity of the opening 61. Additionally, guide walls 65 are partially formed at ends of the bottom board 60. The guide pin 64 and the guide walls 65 linearly guide the first blade 20, the supporting blade 30, and the second blade 50 in the lengthwise direction of the bottom board 60.

The driving lever 70 rotates about the center thereof within a predetermined angular range. The driving lever 70 has the first pin 71 and the second pin 72 at both ends thereof, respectively, and the first pin 71 and the second pin 72 protrude to the blades. Additionally, the driving lever 70 is capable of being stopped in at least of one partway position between one end and the other end of its rotational range. That is to say, the rotation of the driving lever 70 drives the first blade 20, the supporting blade 30 and the second blade 50, so that the light quantity passing through the opening 61 of the bottom board 60 is controlled when the driving lever 70 is stopped at one end, the other end or the partway position.

The motor portion 80 causes a rotational shaft to be connected to the central position of the driving lever 70, and drives the driving lever 70.

The following will describe an actions of the blades.

Figure 3A:
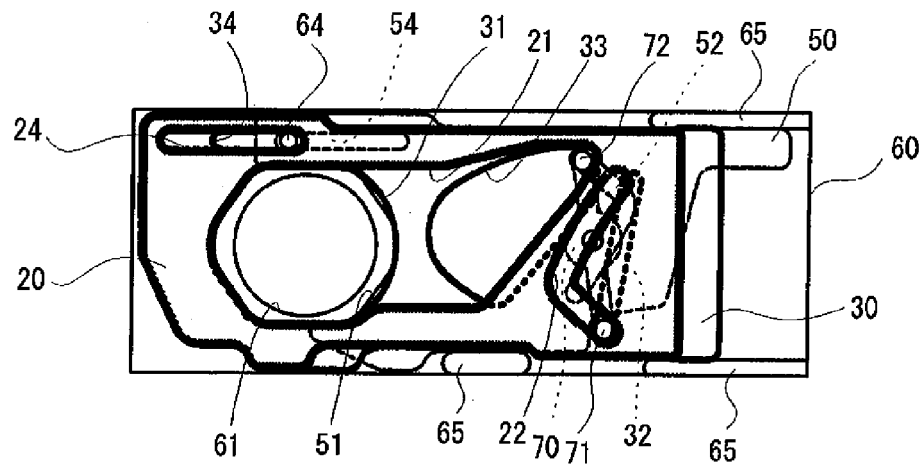
FIGS. 3A to 3C show the action states of the blades.
Figure 3B:
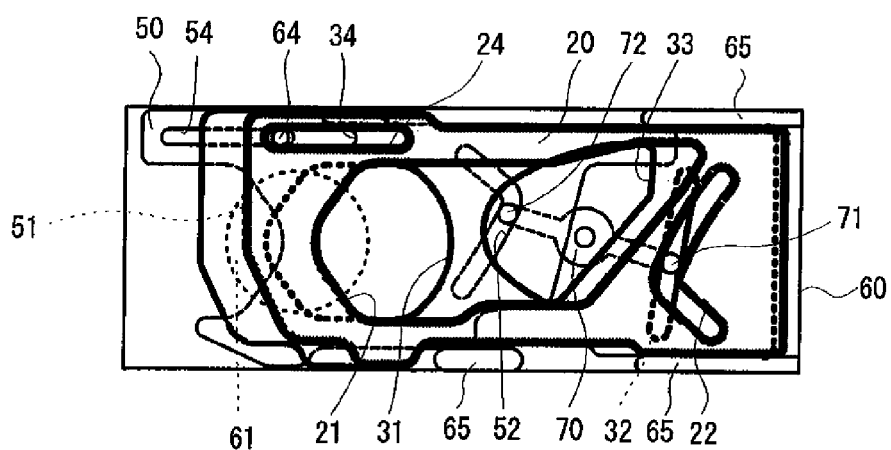
Figure 3C:
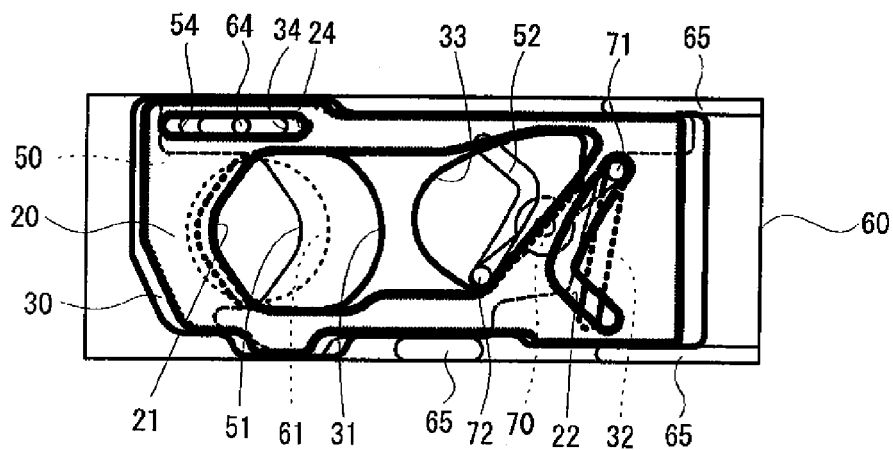

FIGS. 3A to 3C show the action states of the blades, FIG. 3A shows the fully open state, FIG. 3B shows the fully closed state, and FIG. 3C shows the small aperture state. Additionally, in FIGS. 3A to 3C, the blade-supporting plate 10, the plate 40, and the receiving hole 62 of the bottom board 60 are omitted. Further, shapes of the first blade 20 and the supporting blade 30 are simplify illustrated.

The following will describe the fully open state in reference with FIG. 3A.

The fully open state is maintained in such a manner that the opening 61 is surrounded by the opening 21 formed in the first blade 20, the opening 31 formed in the supporting blade 30 and the cutout 51 formed in the second blade 50.

The driving lever 70 is positioned to be substantially parallel with a widthwise direction of the light quantity control device 1.

The following will describe actions from the fully open state to the fully closed state.

As shown in FIG. 3A, the driving lever 70 rotates counterclockwise from the fully open state in which the driving lever 70 is positioned at the other end of the rotational range, so that the first blade 20 and the supporting blade 30 are linearly moved in the right hand direction and the second blade 50 is linearly moved in the left hand direction. That is to say, the first blade 20 and the supporting blade 30, and the second blade 50 are linearly moved in the opposing directions. The state of the opening 61 is controlled to be in the fully closed state in which the driving lever 70 is positioned in the partway of the rotational range thereof. At this time, the fully closed state is maintained in such a manner that the opening 61 is closed by the first blade 20, the supporting blade 30, and the second blade 50.

The following will describe actions from the fully closed state to the small aperture state.

As shown in FIG. 3B, the driving lever 70 further rotates counterclockwise from the fully closed state in which the driving lever 70 is positioned at the partway of the rotational range, so that the first blade 20 and the supporting blade 30 are linearly moved in the left hand direction and the second blade 50 is linearly moved in the right hand direction. As shown in FIG. 3C, the state of the opening 61 is controlled to the small aperture state in which the driving lever 70 is positioned in one end of the rotational range. The small aperture state is maintained in such a manner that the opening 61 is defined by profile of the opening 21 and that of the cutout 51.

As mentioned above, by the rotation of the driving lever 70, the state of the opening 61 is controlled to the fully closed state from the fully open state, and to the small aperture state from the fully closed state.

Figure 4A:
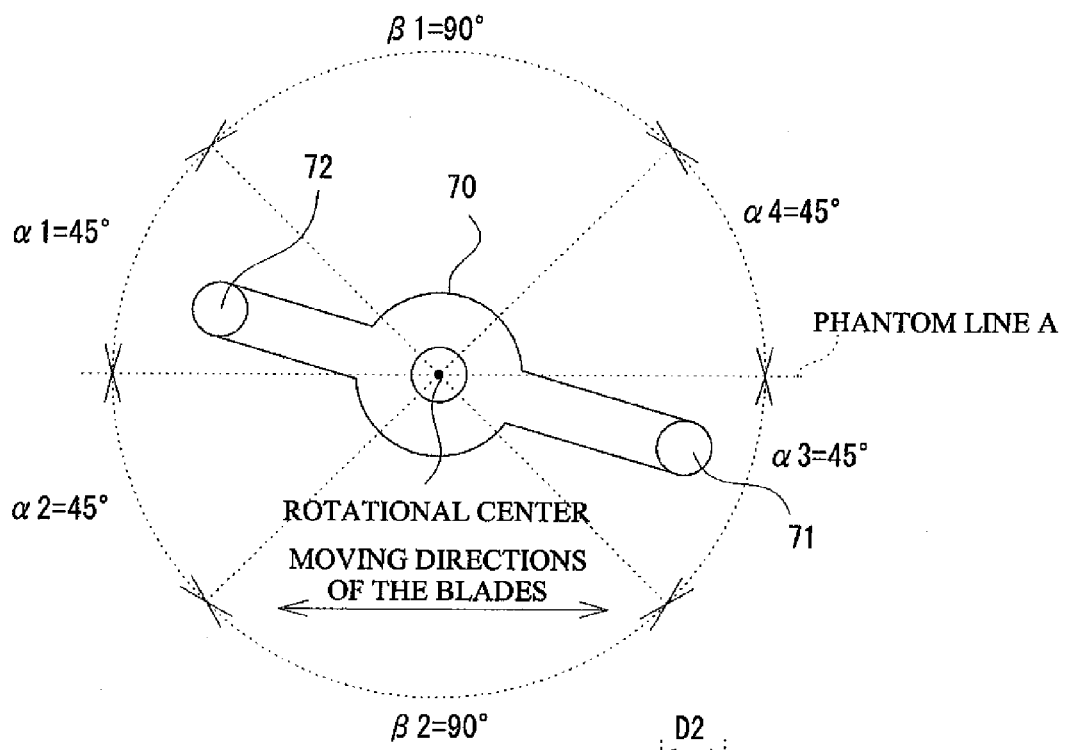
FIGS. 4A to 4C are explanatory views of the position of a driving lever 70 in a fully closed state.
Figure 4B:
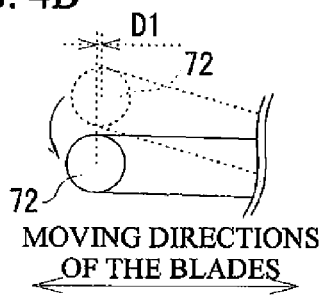
Figure 4C:
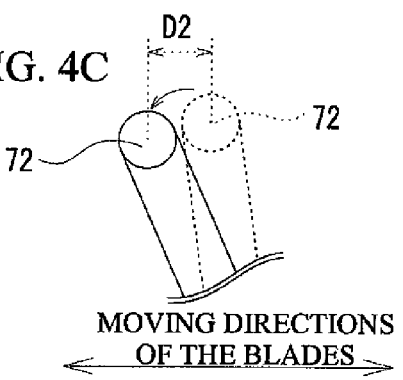

The following will describe the position of the driving lever 70 in detail when the fully closed state is defined. FIGS. 4A to 4C are explanatory views of the position of the driving lever 70 in the fully closed state.

FIG. 4A shows the driving lever 70 at the time when the opening 61 is controlled to the fully closed state, and a phantom line A passing through the rotational center P of the driving lever 70 and being parallel in the moving direction of the blades. Moreover, each of α1 and α3 denote an angular range from the phantom line A to 45 degrees in the clockwise direction with the rotational center P set as a center. Each of α2 and α4 denote an angular range from the phantom line A to 45 degrees in the counterclockwise direction with the rotational center P set as a center. Additionally, each of β1 and β2 denote the remaining angular range other than the above angular ranges.

In the fully closed state, the first pin 71 is positioned within the angular range α3, and the second pin 72 is positioned within the angular range α1. That is to say, in the fully closed state, the driving lever 70 is positioned within the angular ranges of 45 degrees in the clockwise direction from the phantom line A.

The following will describe an effect caused by positioning the driving lever 70 in the position as mentioned above when the opening 61 is shifted to the fully closed state.

FIG. 4B shows the driving lever 70 slightly misaligned counterclockwise from the fully closed state shown in FIG. 4A. FIG. 4C shows the driving lever 70 positioned within the rotational range β1, and β2, and slightly misaligned counterclockwise. In addition, the misaligned angles of the driving lever 70 shown in FIGS. 4B and 4C are substantially identical.

As shown in FIG. 4B, when the driving lever 70 is slightly misaligned, the center of the second pin 72 is misaligned by D1 in the moving direction of the blades.

On the other hand, as shown in FIG. 4C, when the driving lever 70 is slightly misaligned, the center of the second pin 72 is misaligned by D2 in the moving direction of the blades.

When D1 is compared with D2, the rotational angles caused by misalignment of the driving lever 70 are substantially identical, however, the misalignment degrees of the blade in the moving directions are greatly different. D1 is smaller than D2. Additionally, D1 and D2 directly indicate the degrees of the misalignment in the moving direction of the blades. That is, even if the rotational range of the misalignment of the driving lever 70 are substantially identical, each blade is greatly misaligned in the moving direction based on the position of the driving lever 70.

As stated heretofore, the driving lever 70 is positioned within 45 degrees with respect to the phantom line A in the clockwise direction, when the first blade 20, the supporting blade 30 and the second blade 50 control the state of the opening 61 to the fully closed state. Therefore, even if when the driving lever 70 is slightly misaligned from the fully closed state, a displacement of each blade is not greatly affected. Consequently, even if the positional accuracy is roughly set, the fully closed state can be maintained with certainty.

Additionally, even if the second pin 72 is positioned within α2 and the first pin 71 is positioned within α4 at the time when the state of the opening 61 is controlled to be in the fully closed state, that is to say, even if the driving lever 70 is positioned within 45 degrees with respect to the phantom line A in the counterclockwise direction, the above effect can be attained. Consequently, by setting the driving lever 70 to be positioned within 90 degrees centering on the phantom line A, the above effect is attained.

Further, by setting the driving lever 70 to be positioned within the above range at a time when the state of the opening 61 is in the fully open state or the small aperture state as well as the fully closed state, the above effect is attained.

As well as setting the driving lever 70 to be positioned within 90 degrees, it may be positioned within 80 or 70 degrees centering on the phantom line A. Additionally, the driving lever 70 may be set to be substantially parallel with the phantom line A.

The following will describe the slots formed on the blades.

Figure 5A:
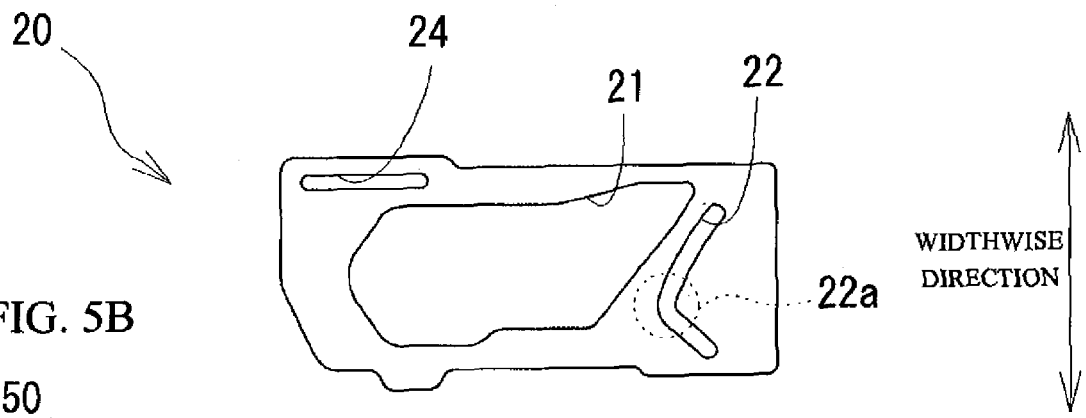
FIGS. 5A to 5C are explanatory views of the slots formed on the blades.
Figure 5B:
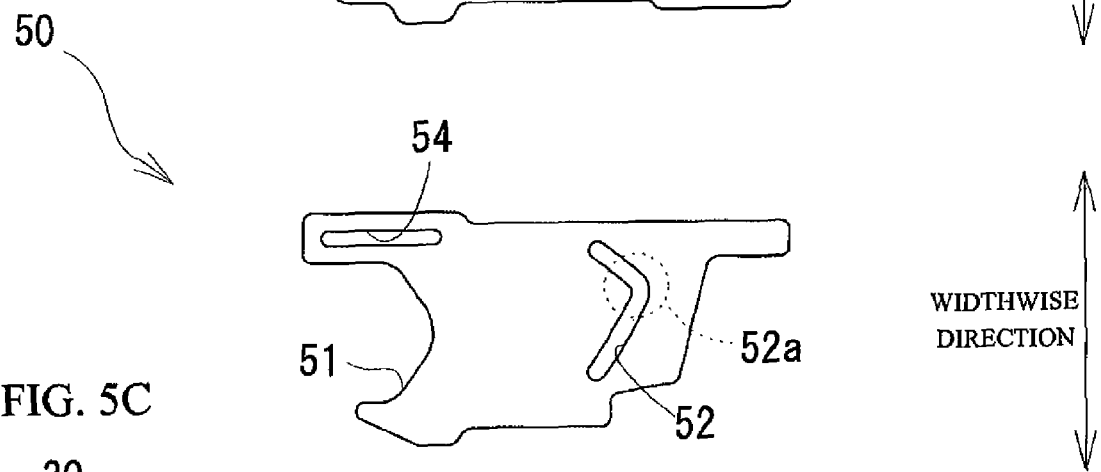
Figure 5C:
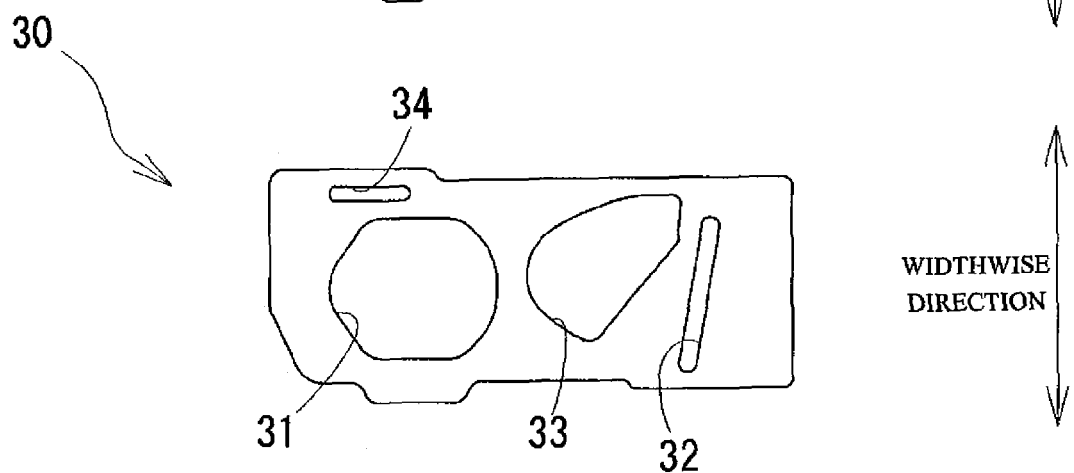

FIGS. 5A to 5C are explanatory views of the slots formed on the blades.

FIG. 5A shows the first blade 20.

In the first blade 20, the slot 22 is formed apart from the opening 21 and is formed in a region more than a half of the first blade 20 in a widthwise direction. The slot 22 is a cam having a shape of a substantially L-shape that bends at the partway, namely, a bending portion 22a. In the slot 22, the bending portion 22a is closer to the opening 21.

FIG. 5B shows the second blade 50.

In the second blade 50, the slot 52 is formed apart from the cutout 51 and is formed in a region more than a half of the second blade 50 in a widthwise direction. The slot 52 is a cam having a shape of a substantially L-shape that bends at the partway, namely, a bending portion 52a. In the slot 52, the bending portion 52a is closer to an opposing side of the cutout 51.

FIG. 5C shows the supporting blade 30.

In the supporting blade 30, the slot 32 is formed in the proximity of the receiving hole 33. The slot 32 is formed in a region that occupies more than a half of the supporting blade 30 in a widthwise direction, and is also formed linearly to slightly tilt in the widthwise direction.

Such slots are formed in the widthwise direction of blades. Therefore, the driving lever 70 can be positioned within 90 degrees with the phantom line A set as a center.

The following will describe relationships between the shape of the slot and the moving distance of the blade.

Figure 6A:
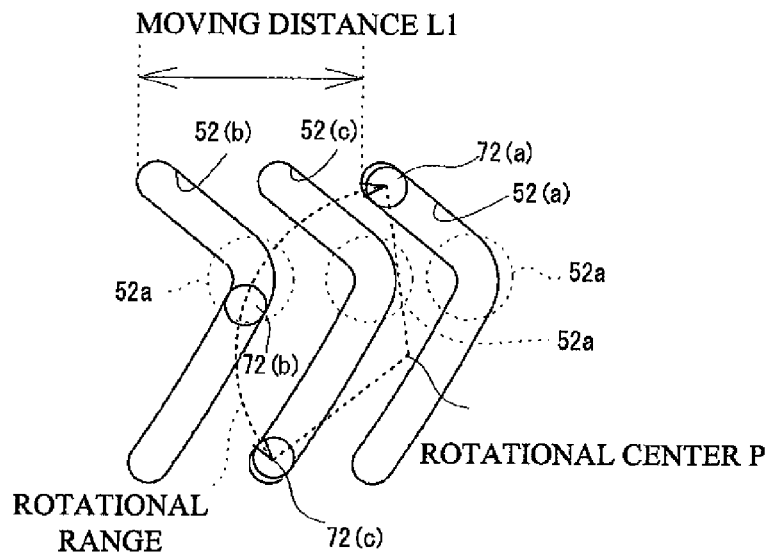
FIGS. 6A to 6C are explanatory views of the difference in moving distances of the blades due to a difference in shapes of the slots.
Figure 6C:
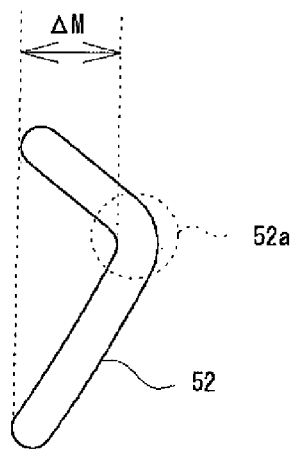
Figure 6B:
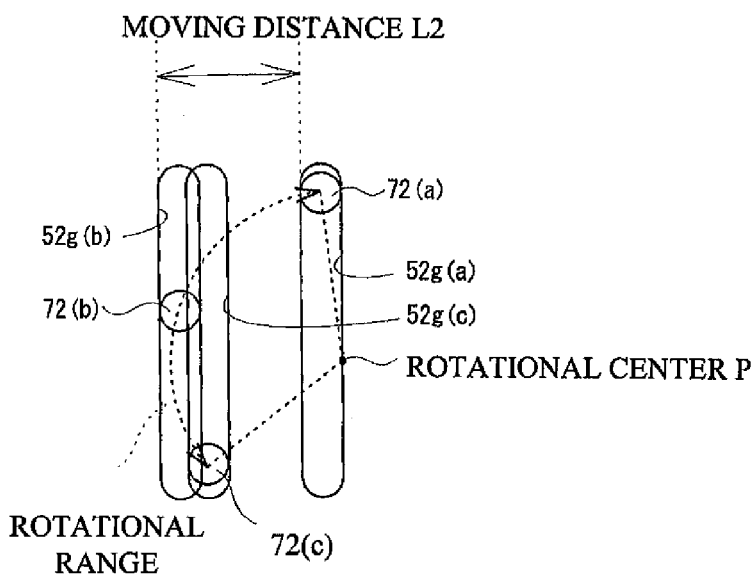

FIGS. 6A to 6C are explanatory views of the difference in moving distances of the blades due to a difference in shapes of the slots.

FIG. 6A shows a change in the position of the slot 52 in response to the rotation of the second pin 72. Additionally, for clearly showing the positions of the second pin 72 and the slot 52 in each state, in FIGS. 6A and 6B, the positions of the second pin 72 and the slot 52 in the fully open position, the fully closed position, and the small aperture position are indicated by (a), (b), and (c) respectively. Further, the second pin 72 rotates about the rotational center P within a predetermined range.

In the fully open state (a), the second pin 72 is positioned at one end of the slot 52. At this time, the slot 52 is positioned in the slightly right side of the rotational center P.

The second pin 72 rotates counterclockwise from the fully open state (a), so that the second pin 72 is positioned at the fully closed position (b) in which the second pin 72 comes closer to the bending portion 52a of the slot 52. At this time, the slot 52 is positioned substantially in the left side of the rotational center P (e.g., opening 61 side). L1 indicates the moving distance of the slot 52 from the fully open position (a) to the fully closed position (b).

Next, the second pin 72 further rotates counterclockwise from the fully closed position (b) to the small aperture position (c), and is positioned at the other end of the slot 52. The slot 52 is positioned again in the right side (that is, in such a direction as to move away from the opening 61) when the second pin 72 is positioned at the small aperture position (c) form the fully closed position (b).

As mentioned above, when the driving lever 70 lies within the above 90 degrees, the bending portion 52a of the slot 52 is closer to the rotational center P of the driving lever 70. Specifically, the slot 52 is shaped to protrude relative to a rotational trace of the second pin 72.

The following will describe the slot 52 shaped in a liner shape perpendicular to a moving direction the blade.

FIG. 6B shows a change in the position of the slot in response to the rotation of the second pin 72, if the slot is formed to be vertical with the moving direction of the blades. Additionally, a slot 52g denotes the slot to be linearly shaped. Further, FIG. 6B shows the slots 52g(a), 52g(b), and 52g(c) corresponding to the above mentioned slots 52(a) 52(b), and 52(c), respectively.

L2 indicates the moving distance of the slot 52g from the position (a) to the position (b).

When the moving distance L1 shown in FIG. 6A is compared with the moving distance L2 shown in FIG. 6B, the moving distance L1 is longer than the moving distance L2.

FIG. 6C shows the shape of the slot 52. As shown in FIG. 6C, when Δm denotes a distance from the bending portion 52a to the end of the slot 52 in the moving direction, the second blade 50 greatly moves in the left hand direction by Δm.

As mentioned above, since the slot 52 is formed such that the bending portion 52a is located closer to the rotational center P, when the driving lever 70 lies in the above range of 90 degrees, the moving distance of the second blade 50 moved by the rotation of the driving lever 70 can be increased.

Additionally, likewise, the slot 22 formed in the first blade 20 has the similar function of the slot 52. This greatly increases the relative moving distances of the first blade 20 and the second blade 50. By greatly increasing the relative moving distances of the first blade 20 and the second blade 50, even if the opening 61 has a lager size than that of each blade or that of the bottom board 60, the state of the opening 61 can be controlled from the fully open state to the fully closed state. Further, the blades or the bottom board 60 can be made smaller with the size of the opening 61 assured. This downsizes the whole light quantity control device.

Additionally, the plate 40 is sandwiched between the supporting blade 30 and the second blade 50. The moving distance of the supporting blade 30 is smaller than that of the first blade 20, but the supporting blade 30 moves in the same direction of the first blade 20. The plate 40 has an ability of buffering the movements of the second blade 50 and the supporting blade 30 that moves in the opposing direction of the second blade 50. This smoothes the movements of the blades, and prevents abrasion thereof.

The following will describe the relationship between the first blade 20 and the supporting blade 30.

Figure 7A:
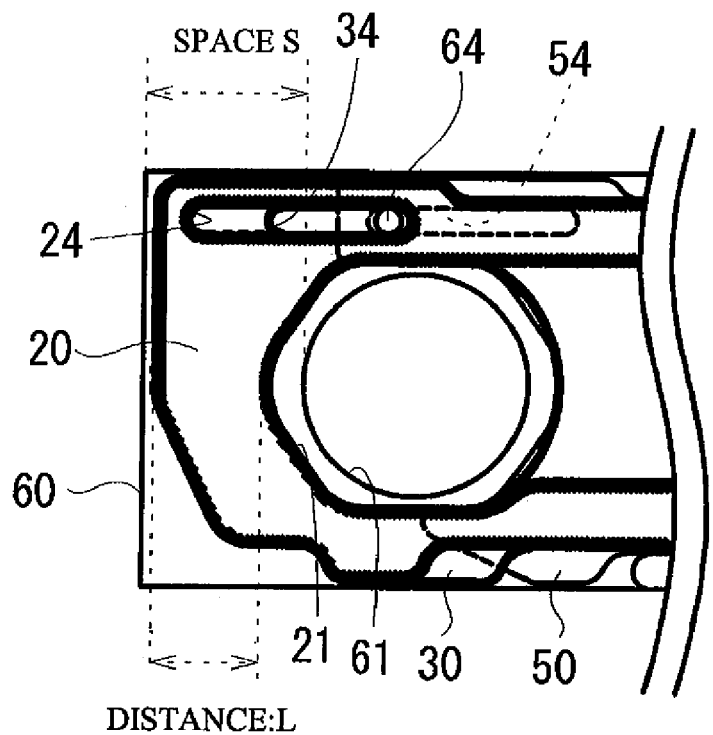
FIGS. 7A and 7B are explanatory views showing the degree of overlapping of a first blade 20 and a supporting blade 30.
Figure 7B:
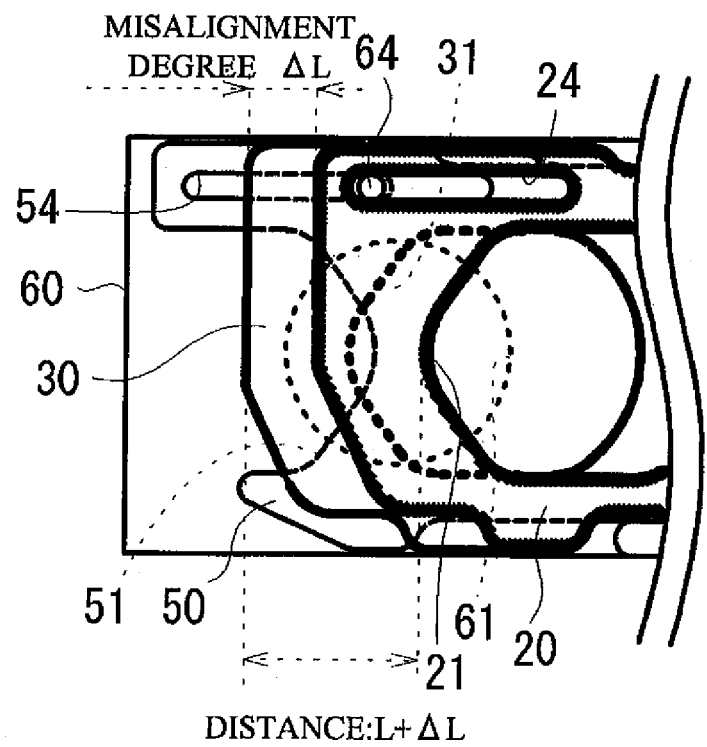

FIGS. 7A and 7B are explanatory views showing the degree of overlapping of the first blade 20 and the supporting blade 30.

FIG. 7A is an enlarged view of the periphery of the opening 61 in the fully open state. FIG. 7B is an enlarged view of the periphery of the opening 61 in the fully closed state.

As shown in FIG. 7A, the first blade 20 and the supporting blade 30 are held by the bottom board 60 with the opening 61 opened. Additionally, the first blade 20 and the supporting blade 30 are held such that a predetermined region of the first blade 20 and that of the second blade 30, covering the opening 61 when the fully closed state is defined, are held within a space S. The space S indicates a distance from the left edge of the opening 61 to the left end of the bottom board 60.

L indicates a distance in which the first blade 20 and the supporting blade 30 are overlapped with each other.

When shifted to the fully closed state, as shown in FIG. 7B, the first blade 20 and the supporting blade 30 covers the opening 61 such a way to reduce the degree of overlapping of the first blade 20 and the supporting blade 30. When ΔL denotes a misalignment degree of overlapping of the first blade 20 and the supporting blade 30, a distance of an area, in which the opening 61 is covered with the first blade 20 and the supporting blade 30, can be expressed by L+ΔL.

As mentioned heretofore, the first blade 20 and the supporting blade 30 are overlapped with each other so as to bring the opening 61 to the fully open state. Next, the degree of overlapping of the first blade 20 and the supporting blade 30 is reduced, as if the first blade 20 and the supporting blade 30 extended, then the first blade 20, the supporting blade 30, and the second blade 50 bring the opening 61 to the fully closed state. Therefore, the space in which the first blade 20 and the supporting blade 30 are held can be reduced. This also downsizes the light quantity control device.

The following will describe the misalignment degree of the first blade 20 and the supporting blade 30 based on the shape differences of the first blade 20 and the supporting blade 30.

Figure 8:
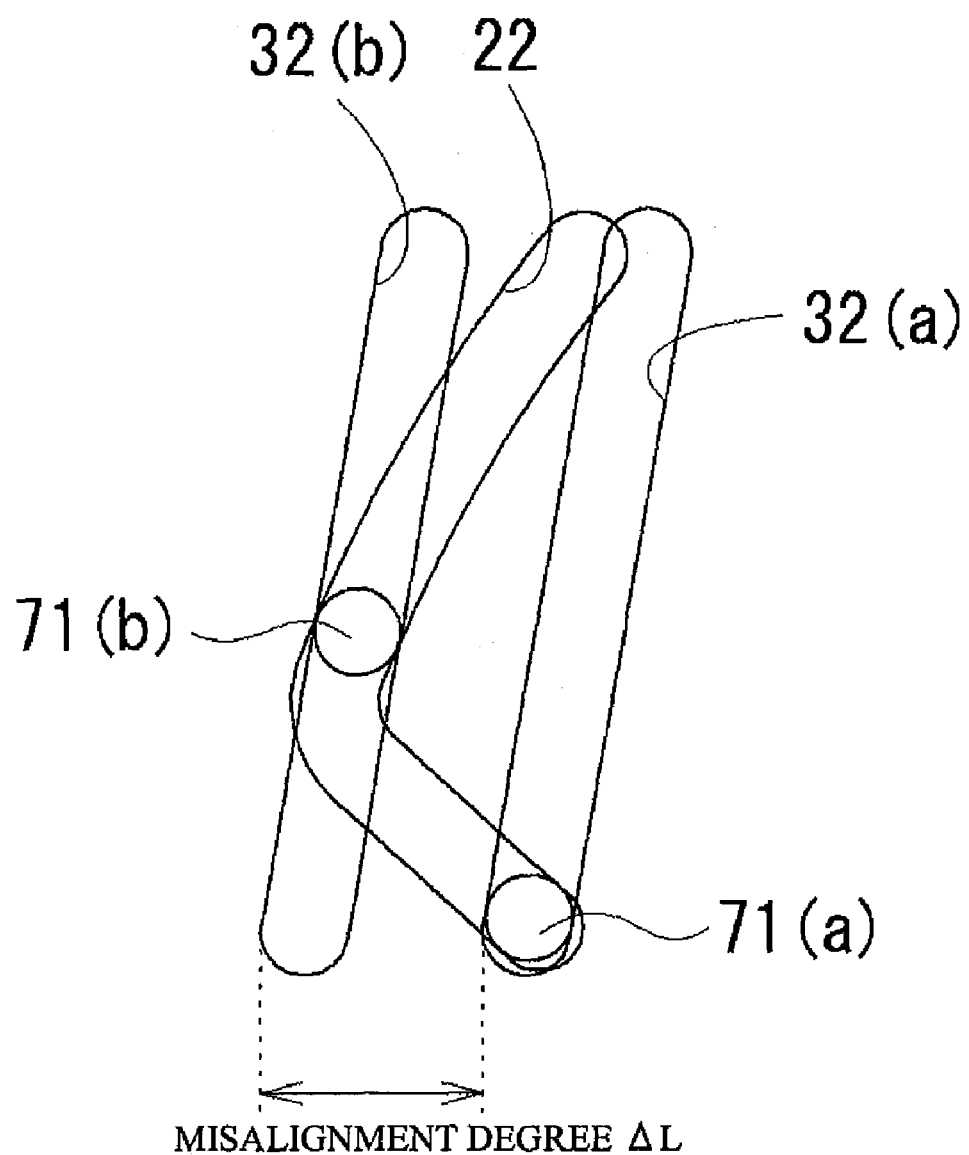
FIG. 8 is an explanatory view of the misalignment degree of the first blade 20 and the supporting blade 30 based on the slots shape differences between the first blade 20 and the supporting blade 30.

FIG. 8 is an explanatory view of the misalignment degree of the first blade 20 and the supporting blade 30 based on the shape differences between the first blade 20 and the supporting blade 30. Additionally, to clearly show positions of the first pin 71 and the slot 32 in each state, 32(a) and 32(b) respectively denote the slot 32 in the fully open position and the fully closed position. Likewise, 71(a) and 71(b) respectively denote the first pin 71 in the fully open position and the fully closed position. Also, how the slot 32 and the first pin 71 are changed is shown on the basis of the slot 22.

As shown in FIG. 8, the slot 32 is positioned on the right side of the slot 22 in the fully open position (a) of the first pin 71. Additionally, the first pin 71 is positioned at the lower ends of the slots 22 and 32.

The first pin 71 rotates counterclockwise from the fully open position (a), and is positioned in the fully closed position (b) near the bending portion 22a of the slot 22. The position of the slot 32 with the first pin 71 positioned in the fully closed position (b) is misaligned and shifted to the left side from the position of the slot 32 with the first pin 71 positioned in the fully open position (a). The misalignment degree at this time is represented by ΔL. This misalignment shown in FIGS. 7A and 7B caused by moving the first blade 20 and the supporting blade 30, because the slot 22 and the slot 32 are differ in the shape from each other. With such a configuration, the overlapping degree of the first blade 20 and the supporting blade 30 can be changed between the time when the opening 61 is brought to the fully closed state and the time when the opening 61 is brought to the fully open state.

The following will describe the position of the driving lever 70 defining the small aperture state.

Figure 9:
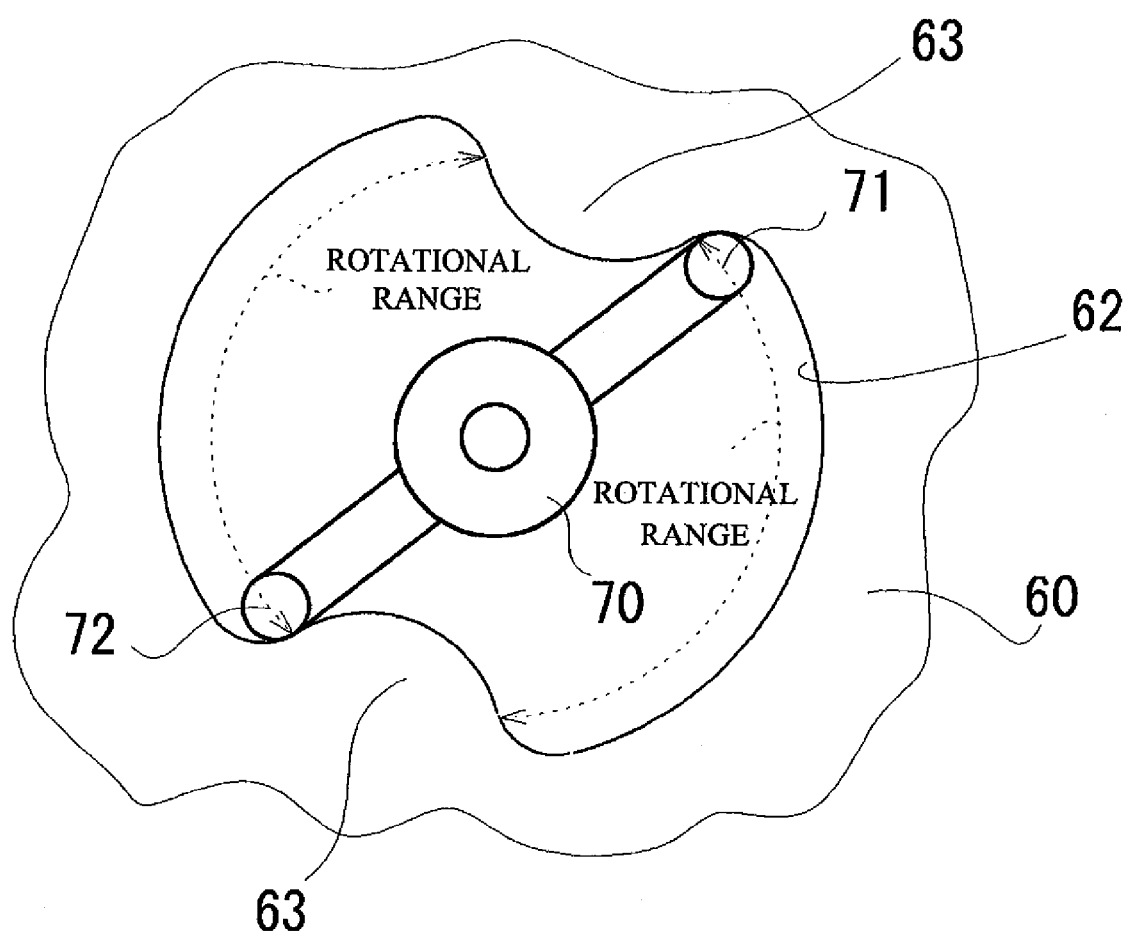
FIG. 9 is an explanatory view of a position of the driving lever defining the small aperture state.

FIG. 9 is an explanatory view of a position of the driving lever defining the small aperture state.

FIG. 9 shows the receiving hole 62 formed in the bottom board 60 and the driving lever 70 when the small aperture state is defined.

The receiving hole 62 is shaped into a substantially circular shape, and is formed with stopper portions 63 such that an inner profile of the receiving hole 62 are partially curved to project to a center thereof. The stopper portions 63 are located at respective two positions in a symmetric manner with respect to the center of the receiving hole 62.

When the small aperture state is defined, the driving lever 70 is restricted to rotate counterclockwise by abutting the first pin 71 and the second pin 72 with the stopper portions 63.

Therefore, when the driving lever 70 is positioned at an end of the rotational range defined by the stopper portions 63, each blade brings the opening 61 to the small aperture state, whereby the opened degree can be constant in the small aperture state. Consequently, the small aperture state is defined with high accuracy.

Further, the stopper portions 63 are integrally formed with the bottom board 60. With such a configuration, the rotational range of the driving lever 70 can be restricted by a simple structure.

Additionally, the first blade 20, the supporting blade 30, and the second blade 50 bring the opening 61 to the fully open state when the driving lever 70 is positioned at the other end of the rotational range thereof, and bring the opening 61 to the fully closed state when the driving lever 70 is positioned at a partway of the rotational range thereof. This configuration maintains the fully open state, the fully closed state, and the small aperture state in the opening 61.

Further, the first blade 20, the supporting blade 30 and the second blade 50 are configured such that the moving directions thereof while the driving lever 70 rotates from one end of the rotational range to the partway position thereof are respectively opposite to those while the driving lever 70 rotates from the above partway position to the other end thereof. Therefore, while the driving lever 70 rotates from one end of the rotational range to the partway position thereof, each of the above blades is shifted from the small aperture position to the fully closed position. While the driving lever 70 rotate from the partway position of the rotational range to the other end thereof, each of the above blade is shifted from the fully closed position to the fully open position.

Additionally, the slots 22 and 52 are shaped into a cam shape in the widthwise direction of each blade. With such a configuration, each blade is easily moved to the small aperture position, the fully closed position, and the fully open position in response to the rotational position of the driving lever 70.

The following will describe a modification of the light quantity control device.

Figure 10:
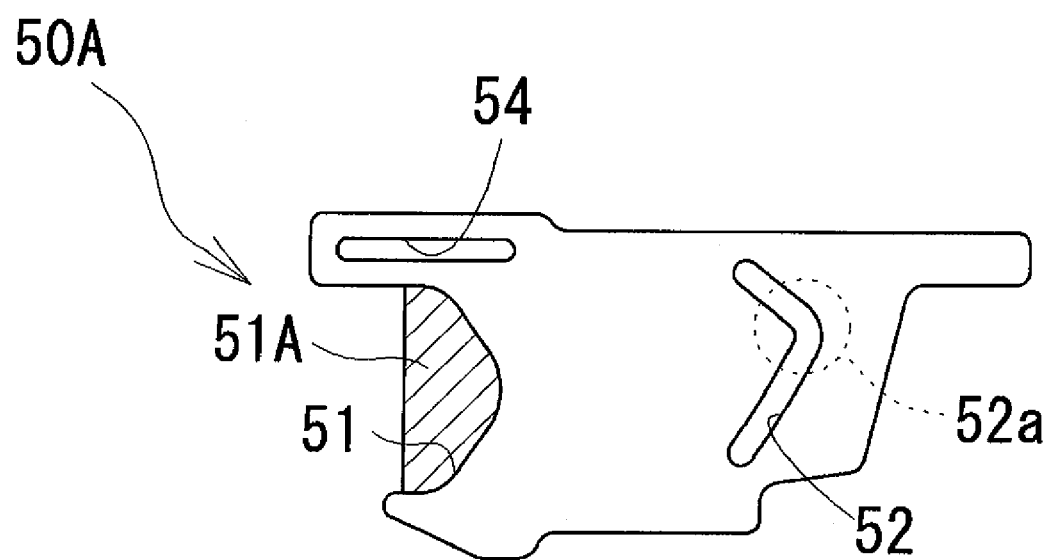
FIG. 10 is an exemplary view of a second blade having a ND filter.

A second blade 50A, according to a modification of the light quantity control device, has a ND filter at the cutout 51. FIG. 10 is an exemplary view of the second blade 50A having the ND filter. The ND filter 51A is provided to cover the opening 61 when the driving lever 70 is positioned at one end of the rotational range, that is to say, when each blade is positioned at the small aperture position.

In this manner, at least one of the blades may be provided with the ND filter.

While the preferred embodiment of the present invention has been illustrated in detail, the present invention is not limited to the above-mentioned embodiment, and other embodiments, variations and modifications may be made without departing from the scope of the present invention.

In the above embodiment, as shown in FIGS. 3A to 3C, the rotation of the driving lever in one direction allow the fully open state to be shifted to the fully closed state, and the fully closed state to be shifted to the small aperture state. However, the present invention is limited to the configuration, for example, the fully closed state may be shifted to the fully open state, and the fully open state may be shifted to the small aperture state.

Additionally, although the number of stop positions of the driving lever is three in the embodiment, and the stop positions may be two including one end and the other end. In this case, the driving lever 70 rotates within 90 degrees with a phantom line set as center, the phantom line passing through the rotational center of the driving lever 70 and being parallel with moving direction of blades.

Movements of the first blade 20, the supporting blade 30, and the second blade 50 may allow the quantity of the light passing through the opening 41, which is smaller than the opening 61 formed on the bottom board 60, formed on the plate 40.

Only the first blade 20 and the second blade 50 may control the quantity of the light passing through the opening 61 without the provision of the supporting blade 30. Additionally, in this case, the plate 40 is arranged between the first blade 20 and the second blade 50, thereby buffering the sliding of both blades.

Finally, several aspects of the present invention are summarized as follows.

According to an aspect of the present invention, there is provided a light quantity control device includes: a bottom board having an opening; a first blade and a second blade linearly moving in opposing directions and changing in an opening area of the opening; a supporting blade overlapping the first blade and closing the opening in cooperation with the first blade and the second blade; and a driving lever connected to the first blade, the second blade, and the supporting blade, and driving the first blade, the second blade, and the supporting blade by rotation of the driving lever. The first blade and the supporting blade are engaged with an identical pin provided in the driving lever, the first blade and the supporting blade are misaligned in such a way to reduce an overlapping degree of the first blade and the supporting blade, and the first blade and the supporting blade bring the opening to the fully closed state in cooperation with the second blade.

With such a configuration, the opening is brought to the fully open state with the first blade overlapping the supporting blade, and the first blade and the supporting blade are misaligned in such a way to reduce an overlapping degree of the first blade and the supporting blade and the first blade and the supporting blade bring the opening to the fully closed state in cooperation with the second blade. Therefore, the space in which the blades are held can be reduced. Additionally, since the first blade and the supporting blade are engaged with the identical pin provided in the driving lever, the light quantity control device can be downsized by a simple structure without a provision of an elongated arm of the driving lever and without an increase in engagement points. Additionally, the first blade and the supporting blade may have slots each shaped into different shapes such that moving distances of the blades are different.

With such a configuration, the overlapping degree of the first blade and the supporting blade can be changed between the time when the opening is brought to the fully closed state and the time when the opening is brought to the fully open state. Therefore, the supporting blade is prevented from improperly moving and the light quantity control device can be downsized by a simple structure.

Further, a slot of the first blade and a slot of the supporting blade may be formed in widthwise directions of the first blade and the supporting blade, respectively, the slot of the supporting blade is linearly shaped, and the slot of the first blade is a cam having a substantially L shape.

With such a configuration, moving distances of the first blade and the supporting blade are different with ease.

What is claimed is:

1. A light quantity control device comprising:
a bottom board having an opening;
a first blade and a second blade linearly moving in opposing directions and changing an opening area of the opening;
a supporting blade overlapping the first blade and closing the opening in cooperation with the first blade and the second blade; and
a driving lever connected to the first blade, the second blade, and the supporting blade, and driving the first blade, the second blade, and the supporting blade by rotation of the driving lever, wherein the first blade and the supporting blade are engaged with an identical pin provided in the driving lever, the first blade and the supporting blade are misaligned in such a way to reduce an overlapping degree of the first blade and the supporting blade, and the first blade and the supporting blade bring the opening to the fully closed state in cooperation with the second blade, wherein the driving lever has a shape extending in a predetermined direction and the predetermined direction is capable of being parallel with the moving directions of the blades.

2. The light quantity control device according to claim 1, wherein the first blade and the supporting blade have slots each shaped into different shapes such that moving distances of the blades are different.

3. The light quantity control device according to claim 2, wherein a slot of the first blade and a slot the supporting blade are formed in widthwise directions of the first blade and the supporting blade, respectively;

the slot of the supporting blade is linearly shaped; and the slot of the first blade is a cam having a substantially L shape.

4. The light quantity control device according to claim 1, wherein a slot of the first blade and a slot of the supporting blade are formed in widthwise directions of the first blade and the supporting blade, respectively;

the slot of the supporting blade is linearly shaped; and the slot of the first blade is a cam having a substantially L shape.

* * * * *